UNITED STATES PATENT OFFICE.

CARL JENSÉN, OF NEW YORK, N. Y.

METHOD OF PRESERVING SAUSAGES.

SPECIFICATION forming part of Letters Patent No. 388,879, dated September 4, 1888.

Application filed April 24, 1888. Serial No. 271,736. (No specimens.)

*To all whom it may concern:*

Be it known that I, CARL JENSÉN, a resident of New York city, New York, have invented a new and Improved Process of Preserving Sausages, of which the following is a specification.

This invention relates to a process for preserving smoked (Bologna) sausages, by which the time for subjecting the sausages to the smoke is reduced, the sausages are rendered more juicy and are protected from the air, so as to keep for a long time.

In carrying out my improved process I proceed as follows: The sausage properly stuffed is subjected to the action of smoke for about an hour and a quarter, in lieu of four to five hours, as heretofore. The sausage is then cooked in a bath containing an essence which I make as follows: I take fourteen parts of Bismarck dye, two parts of garnet dye, and one and a half pint of scalding water. This mixture I put in a bottle and leave it in a hot place for a few hours, it being well shaken from time to time. When dissolved, I add some cold water, and the essence is ready for use. The bath for cooking—say, three hundred pounds of sausages—should contain about one wine-glassful of the essence. The cooking of the sausage in this bath will cause the sausage to assume a brown glossy color, and will at the same time prepare the skin for the reception and retention of the uppermost coating. In preparing this uppermost coating I take thirty-two ounces of shellac, twenty ounces of rosin, eight ounces of gum-sandarac, one-half ounce of white turpentine, and one gallon of alcohol. These ingredients are mixed well in a can and the mixture is for a few hours put in a hot place or in a pail of scalding water, it being well shaken from time to time. When properly dissolved the compound is ready for use. After the sausages have been cooked in the essence as described and while still moist, their skin must be immediately painted over with the coating, after which the sausages are ready for use.

The sausages prepared in the above-described manner will be virtually air-tight and may be shipped for great distances. They will be fresh, light, and without wrinkles, and will retain their juice for a very long time.

What I claim is—

The process of preserving sausages, which consists in smoking the sausages, then cooking them in a bath containing Bismarck dye and garnet dye, and then coating them over while still moist with an air-excluding compound, consisting of shellac, rosin, gum-sandarac, turpentine, and alcohol, substantially as specified.

CARL JENSÉN.

Witnesses:
F. V. BRIESEN,
HENRY E. ROEDER.